United States Patent
Sethi et al.

(10) Patent No.: US 10,855,523 B2
(45) Date of Patent: Dec. 1, 2020

(54) INTENTION-BASED DEVICE COMPONENT TRACKING SYSTEM

(71) Applicant: Dell Products L.P., Round Rock, TX (US)

(72) Inventors: Parminder Singh Sethi, Punjab (IN); Vaideeswaran Ganesan, Bangalore (IN); Arjit Rastogi, New Delhi (IN); Prabhat Chandra Biswas, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 16/399,422

(22) Filed: Apr. 30, 2019

(65) Prior Publication Data
US 2020/0351150 A1  Nov. 5, 2020

(51) Int. Cl.
*H04L 12/24* (2006.01)
*G06F 11/30* (2006.01)
*H04L 12/26* (2006.01)
*G08B 21/24* (2006.01)
*G06F 11/32* (2006.01)

(52) U.S. Cl.
CPC ...... *H04L 41/0681* (2013.01); *G06F 11/3048* (2013.01); *G06F 11/3051* (2013.01); *G06F 11/327* (2013.01); *G08B 21/24* (2013.01); *H04L 41/0622* (2013.01); *H04L 41/0853* (2013.01); *H04L 43/0811* (2013.01)

(58) Field of Classification Search
CPC .......... H04L 41/0681; H04L 41/0622; H04L 43/0811; G06F 11/3048; G06F 11/3051; G06F 11/327; G08B 21/24
See application file for complete search history.

(56) References Cited

U.S. PATENT DOCUMENTS

| 2007/0233842 A1 | 10/2007 | Roberts et al. |
| 2009/0012805 A1* | 1/2009 | Schnell ............... G06Q 50/184 705/310 |
| 2011/0084839 A1 | 4/2011 | Groth et al. |

(Continued)

OTHER PUBLICATIONS

Parminder Singh Sethi, Bhuvaneswari Tamilchelvan, Lakshmi Narasimhan MC, "System and Method for Managing a Rechargeable Battery Based on Historical Charging Data," Filed on May 9, 2018, 26 Pages, U.S. Appl. No. 15/974,761.

*Primary Examiner* — Arvin Eskandarnia
(74) *Attorney, Agent, or Firm* — Haynes and Boone, LLP

(57) ABSTRACT

A component tracking system includes a plurality of devices that each include a device component monitoring subsystem that monitors for and records the addition and/or removal of device components to/from that device. A device component manager system that is coupled to each of the plurality of devices identifies, via a recording by a first device monitoring subsystem in a first device included in the plurality of devices, the removal of a first device component from the first device. The device component manager system then determines, via a recording by a second device component monitoring subsystem in a second device included in the plurality of devices, that the first device component has been added to the second device within a time period and, in response, the device component manager device prevents a removed first device component alarm.

20 Claims, 9 Drawing Sheets

(56) References Cited

U.S. PATENT DOCUMENTS

2012/0036220 A1\* 2/2012 Dare ..................... H04L 67/04
709/217
2012/0306658 A1 12/2012 Karaffa et al.
2016/0011949 A1\* 1/2016 Perez-Feliciano ........ G06F 1/00
714/4.12

\* cited by examiner

INTENTION-BASED DEVICE COMPONENT TRACKING SYSTEM

BACKGROUND

The present disclosure relates generally to information handling systems, and more particularly to tracking components that are added to and removed information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may sometimes be provided in groups. For example, many server devices are often provided in server racks or other server chassis in a datacenter that is under the management of network administrators or other users. Furthermore, each of the server devices may include a variety of server device components (e.g., memory components, storage components, networking components, and/or other server device components known in the art), with those server device components capable of being quickly and easily removed from any particular server device in the datacenter, and in some cases added to other server devices in the datacenter. As such, datacenters with many server devices include many more server device components, and those server device components often become misplaced or even permanently lost due to a failure to document which server device those server device components were previously provided in, when those server device components were removed from a server device, when those server device components were moved between server devices, and/or a variety of other server device component actions that would be apparent to one of skill in the art.

Accordingly, it would be desirable to provide for the tracking of device components.

SUMMARY

According to one embodiment, an Information Handling System (IHS) includes a processing system; and a memory system that is coupled to the processing system and that includes instructions that, when executed by the processing system, cause the processing system to provide a device component manager engine that is configured to: identify, via a first device monitoring subsystem in a first device that is included in a plurality of devices, the removal of a first device component from the first device; determine, via a second device component monitoring subsystem in a second device that is included in the plurality of devices, that the first device component has been added to the second device within a time period; and prevent, in response to determining that the first device component has been added to the second device within the time period, a removed first device component alarm.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
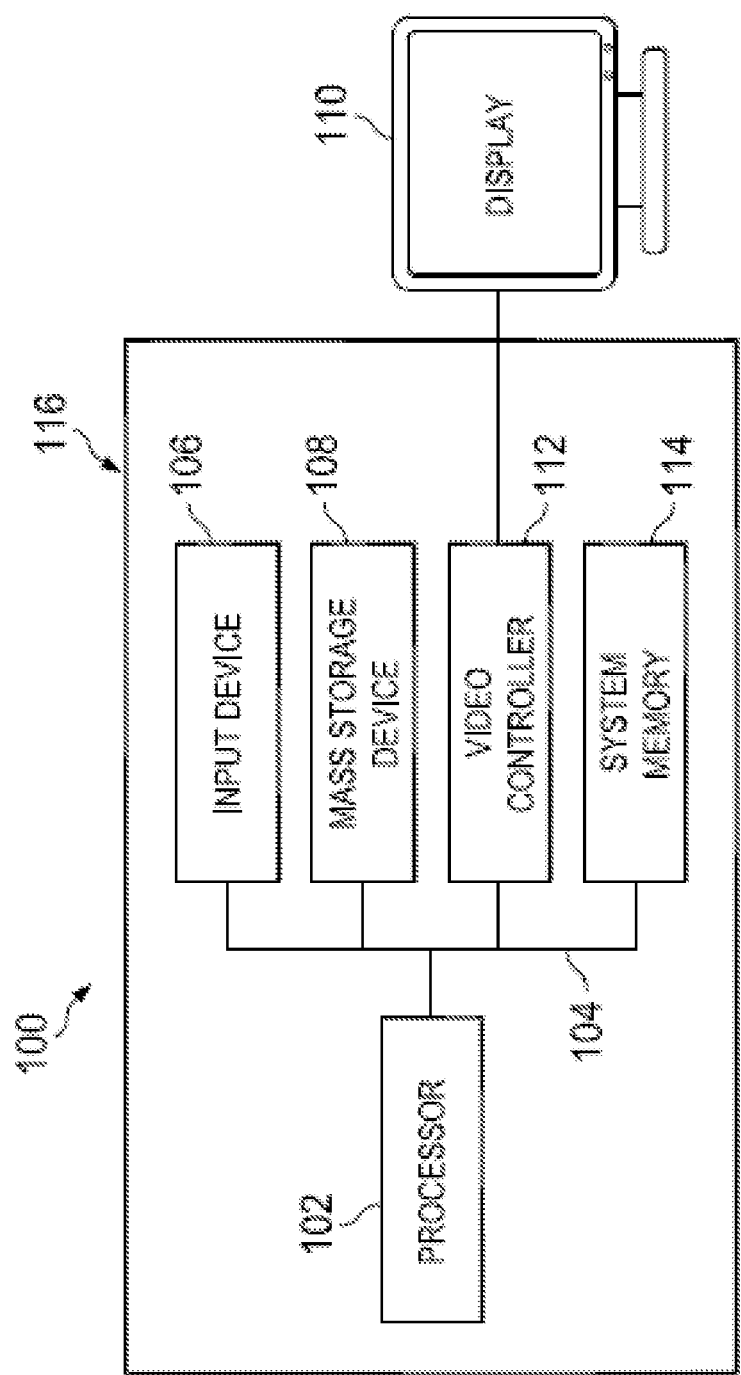
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
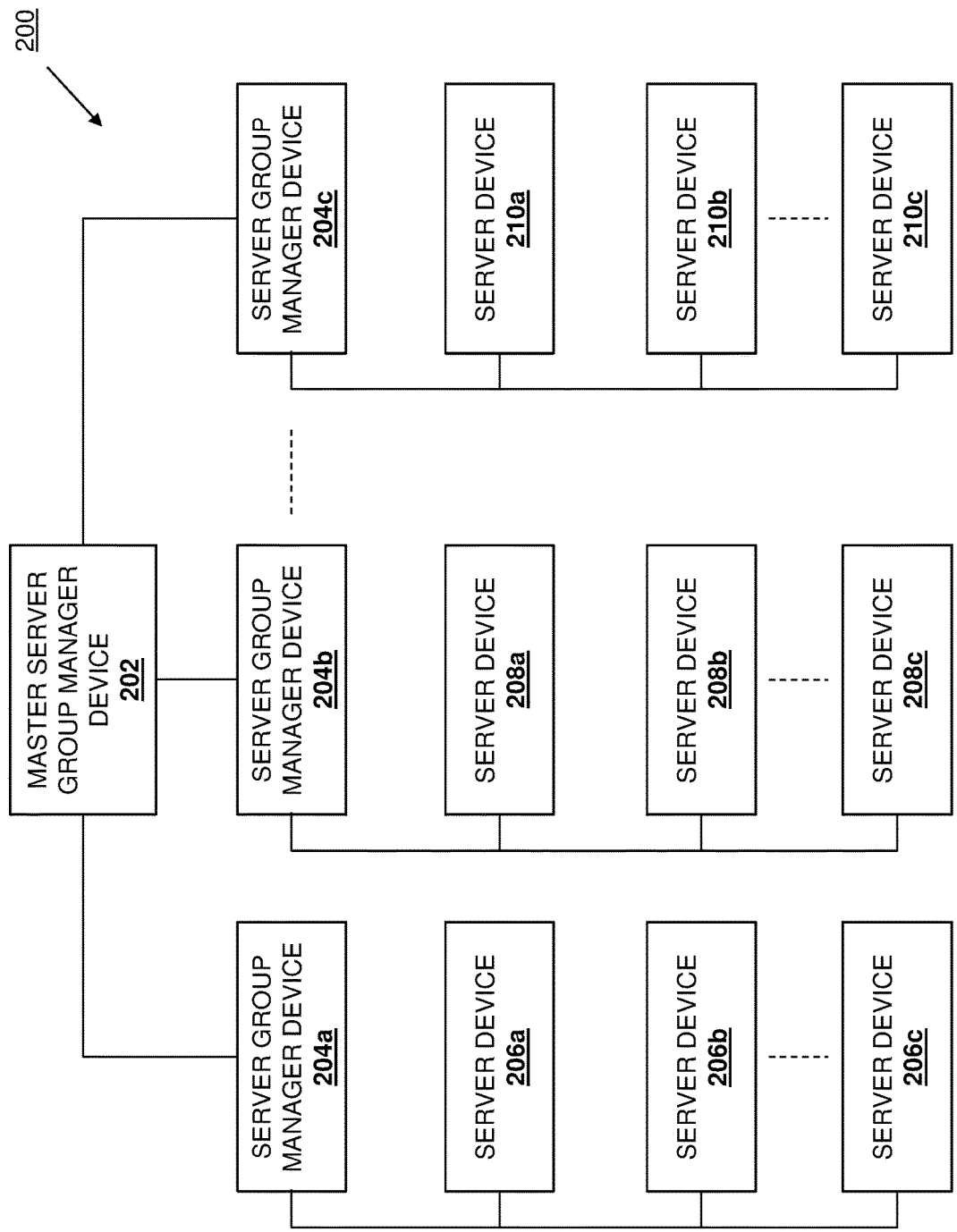
FIG. 2 is a schematic view illustrating an embodiment of device component tracking system.

Referring now to FIG. 2, an embodiment of a device component tracking system 200 is illustrated. In the illustrated embodiment, the device component tracking system 200 includes a master server group manager device 202. In an embodiment, the master server group manager device 202 may be provided by the IHS 100 discussed above with reference to FIG. 1, and/or may include some or all of the components of the IHS 100. In the examples provided below, the master server group manager device 202 is a server device that performs manager functionality for a plurality of server group manager devices as discussed below. However, while illustrated and discussed below as a server device, one of skill in the art in possession of the present disclosure will recognize that master server group manager device 202 provided in the device component tracking system 200 may be provided by any devices that may be configured to operate similarly as discussed below. The master server group manager device 202 is coupled to a plurality of server group manager devices 204a, 204b, and up to 204c, any or all of which may be provided by the IHS 100 discussed above with reference to FIG. 1, and/or may include some or all of the components of the IHS 100. In the examples provided below, the server group manager devices 204a-c are each server devices that perform device component manager functionality for a plurality of server devices as discussed below. However, while illustrated and discussed below as server devices, one of skill in the art in possession of the present disclosure will recognize that server group manager devices 204a-c provided in the device component tracking system 200 may be provided by any devices that may be configured to operate similarly as discussed below.

Each of server group manager devices 204a-c is coupled to a respective plurality of server devices, including the server devices 206a, 206b, and up to 206c coupled to the server group manager device 204a; the server devices 208a, 208b, and up to 208c coupled to the server group manager device 204b; and the server devices 210a, 210b, and up to 210c coupled to the server group manager device 204c. For example, each group of server devices (e.g., the group of server devices 206a-c, the group of server devices 208a-c, and the group of server devices 210a-c) may be server devices provided in respective datacenters, with the respective server group manager devices 204a-c providing device component manager functionality for each respective group of server devices in each respective datacenter, and the master server group manager device 202 providing manger functionality for the server group manager devices 204a-c across those datacenters. However, while illustrated and described as server devices, one of skill in the art in possession of the present disclosure will recognize that the server devices for which device components are tracked below may be replaced by a variety of other devices (e.g., networking devices such as switch devices, storage devices, etc.) while remaining within the scope of the present disclosure as well. Furthermore, one of skill in the art in possession of the present disclosure will recognize that many more devices may (and typically will) be coupled to the manager devices (e.g., in a datacenter) while remaining within the scope of the present disclosure. As such, while a specific device component tracking system 200 has been illustrated and described, one of skill in the art in possession of the present disclosure will recognize that the system of the present disclosure may include a variety of devices and device configurations while remaining within the scope of the present disclosure as well.

Figure 3:
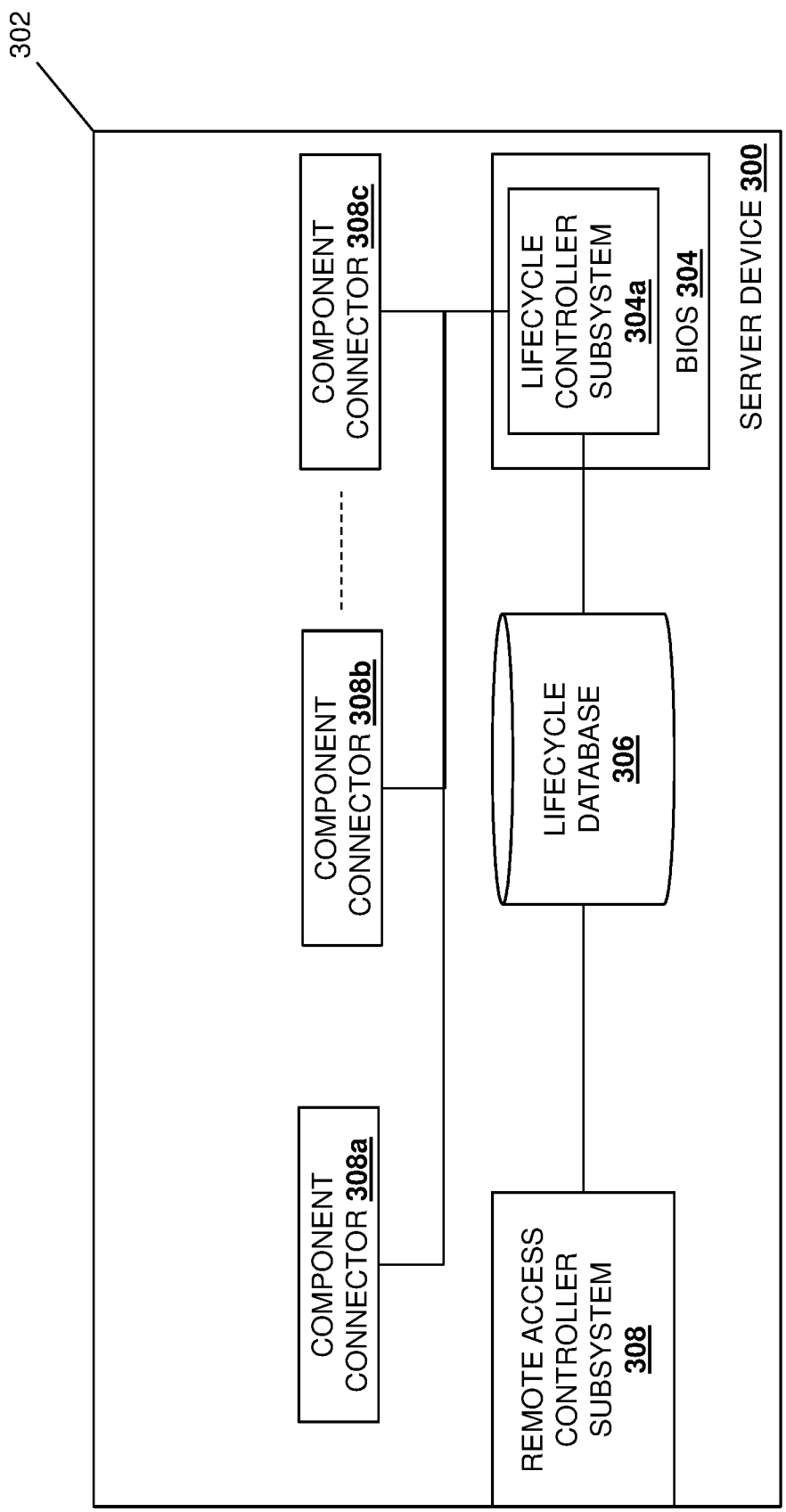
FIG. 3 is a schematic view illustrating an embodiment of a server device that may be provided in the device component tracking system of FIG. 2.

Referring now to FIG. 3, an embodiment of a server device 300 is illustrated that may provide any of the server devices 206a-c, 208a-c, and 210a-c discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices (e.g., the networking devices or storage devices discussed above) that are configured to operate similarly as discussed below. In the illustrated embodiment, the server device 300 includes a chassis 302 that houses the components of the server device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a BIOS 304 that is configured to perform the functionality of the BIOS and/or server devices discussed below.

One of skill in the art in possession of the present disclosure will recognize that the BIOS 304 may be provided via non-volatile firmware that is configured to perform hardware initialization during a booting process for the server device 300, as well as provide runtime services for an operating system and/or other programs provided on the server device 300. As would be understood by one of skill in the art in possession of the present disclosure, the BIOS 304 may be provided as a Unified Extensible Firmware Interface (UEFI) BIOS. Thus, while UEFI is known in the art as a specification that has been provided to replace the conventional BIOS, and that defines a software interface between an operating system and platform firmware provided on computing devices, one of skill in the art in possession of the present disclosure will recognize that the discussions of the BIOS 304 below apply to a UEFI BIOS as well. In the illustrated embodiment, the BIOS 304 is configured to provide a lifecycle controller subsystem 304a.

For example, the lifecycle controller subsystem 304a may be provided as part of a lifecycle controller provided on server devices (e.g., POWEREDGE® server devices) available from DELL® Inc. of Round Rock, Tex., United States, and thus may operate to provide embedded systems management in conjunction with the remote access controller subsystem discussed in further detail below, as well as perform multiple operations at a BIOS level including, for example, operating system deployment, firmware updates, and hardware log collection. However, one of skill in the art in possession of the present disclosure will recognize that other subsystems may provide the functionality described below as being performed by the lifecycle controller subsystem 304a while remaining within the scope of the present disclosure as well.

The chassis 302 may also house a storage system (not illustrated, but which may include the storage device 108 discussed above with reference to FIG. 1) that is coupled to the BIOS 304 (e.g., via a coupling between the storage system and the processing system) and that includes a lifecycle database 306 that is configured to store any of the information utilized by the lifecycle controller subsystem 304a, BIOS 304, and/or remote access controller subsystem discussed below. The chassis 302 may also house a remote access controller subsystem 308 that is coupled to the lifecycle database 306 (e.g., via a coupling between the remote access controller subsystem 308 and the storage system) and that may be provided by an integrated DELL® Remote Access Controller (iDRAC), a Baseboard Management Controller (BMC), and/or other remote access controller device known in the art. In a specific example, the remote access controller subsystem 308 may be provided as part of a lifecycle controller provided on server devices (e.g., POWEREDGE® server devices) available from DELL® Inc. of Round Rock, Tex., United States, and thus may operate to provide embedded systems management in conjunction with the lifecycle controller subsystem 304a discussed above. In specific examples, the remote access controller subsystem 308 and the lifecycle controller subsystem 304a of the present disclosure utilize existing hardware and software for providing the lifecycle controller discussed above, with enhancements that allow for the device component tracking functionality described herein, thus enabling such functionality via existing infrastructure.

In the illustrated embodiment, a plurality of component connectors 308a, 308b, and up to 308c are included in the server device 300 and coupled to the lifecycle controller subsystem 304a and/or the BIOS 304. For example, the component connectors 308a-c may be provided by any connector that is configured to connect a device component to the server device 300. As such, card connectors (e.g., Peripheral Component Interconnect express (PCIe) connectors), storage device connectors (e.g., Hard Disk Drive (HDD) connectors, Solid State Drive (SDD) connectors, etc.), memory component connectors, and/or any other connector that would be apparent to one of skill in the art in possession of the present disclosure may be provided in the server device 300 and utilized as discussed below. However, while a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
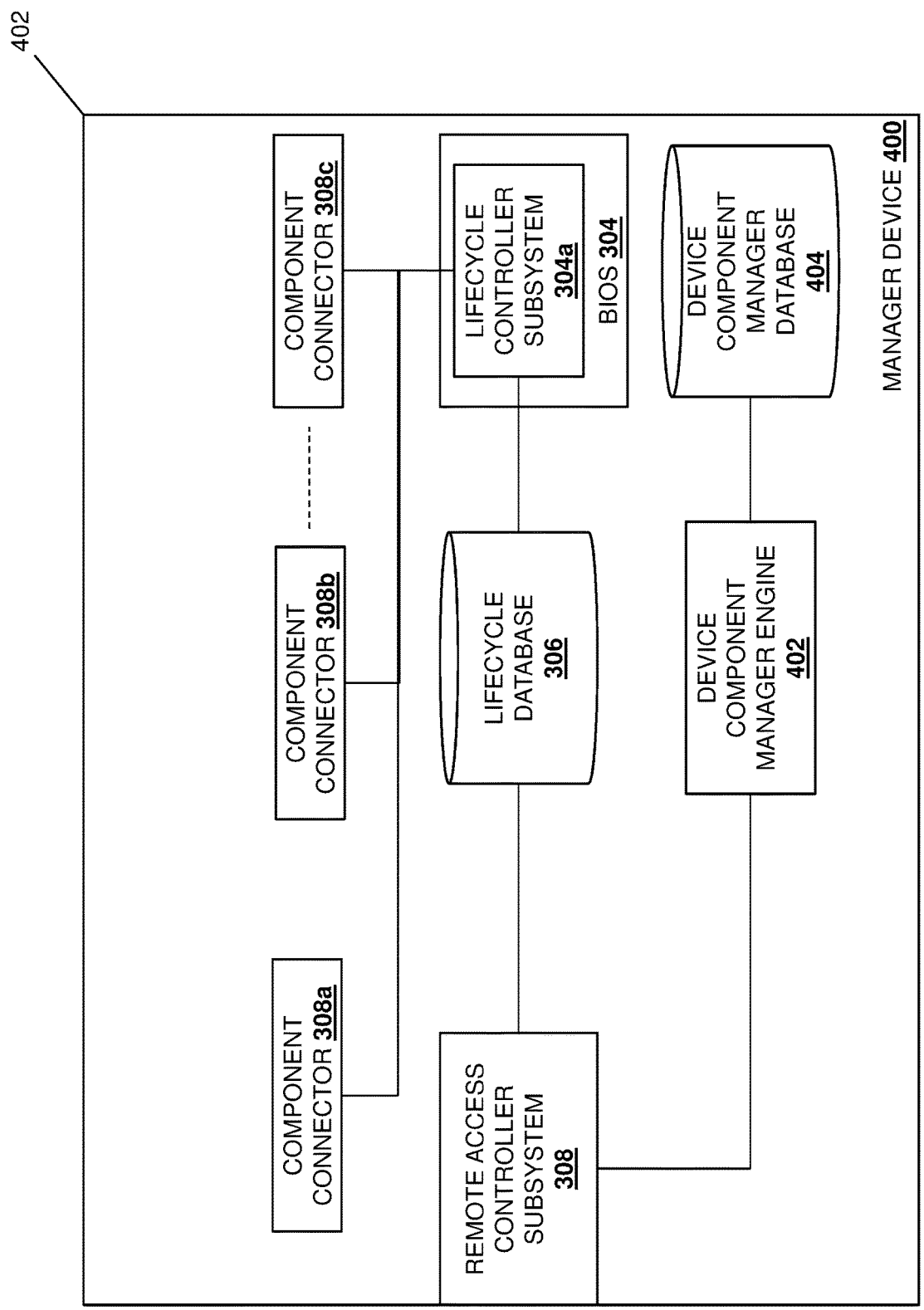
FIG. 4 is a schematic view illustrating an embodiment of a manager device that may be provided in the device component tracking system of FIG. 2.

Referring now to FIG. 4, an embodiment of a manager device 400 is illustrated that may provide any of the server group manager devices 204a-c and/or the master server group manager device 202 discussed above with reference to FIG. 2. As such, the manager device 400 may be provided by the IHS 100 discussed above with reference to FIG. 1 and/or may include some or all of the components of the IHS 100. Furthermore, while illustrated and discussed below as a server device, one of skill in the art in possession of the present disclosure will recognize that the functionality of the manager device 400 discussed below may be provided by other devices that are configured to operate similarly as discussed below. In the illustrated embodiment, the manager device 400 includes a chassis 402 that houses the components of the manager device 400, only some of which are illustrated below. In particular, the illustrated embodiment provides an example of the manager device 400 provided by a server device that is substantially similar to the server device 300 discussed above with reference to FIG. 3 and, as such, includes the BIOS 304, the lifecycle controller subsystem 304a, the lifecycle database 306, the remote access controller subsystem 308, and the component connectors 308a-c discussed above with reference to FIG. 3. Thus, in some example, the manager device 400 may be configured to perform the same functionality as the server devices 300 discussed below, in addition to the manager functionality discussed below. However, one of skill in the art in possession of the present disclosure will recognize that dedicated manager devices that do not perform the functionality of the server devices 300 discussed below will fall within the scope of the present disclosure as well.

For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a device component manager engine 402 that is configured to perform the functionality of the device component manager engines and/or manager devices discussed below. As illustrated, the device component manager engine 402 may be coupled to the remote access controller subsystem 308 (e.g., via a coupling between the remote access controller subsystem 308 and the processing system). In addition, the chassis 402 may also house a storage system (not illustrated, but which may include the storage device 108 discussed above with reference to FIG. 1) that is coupled to the device component manager engine 402 (e.g., via a coupling between the storage system and the processing system) and that includes a device component manager database 404 that is configured to store any of the information utilized by the device component manager engines, manager devices, and remote access controller devices discussed below. However, while a specific manager device 400 has been illustrated, one of skill in the art in possession of the present disclosure will recognize that manager devices (or other devices operating according to the teachings of the present disclosure in a manner similar to that described below for the manager device 400) may include a variety of components and/or component configurations for providing conventional manager device functionality, as well as the functionality discussed below, while remaining within the scope of the present disclosure as well.

Figure 5A:
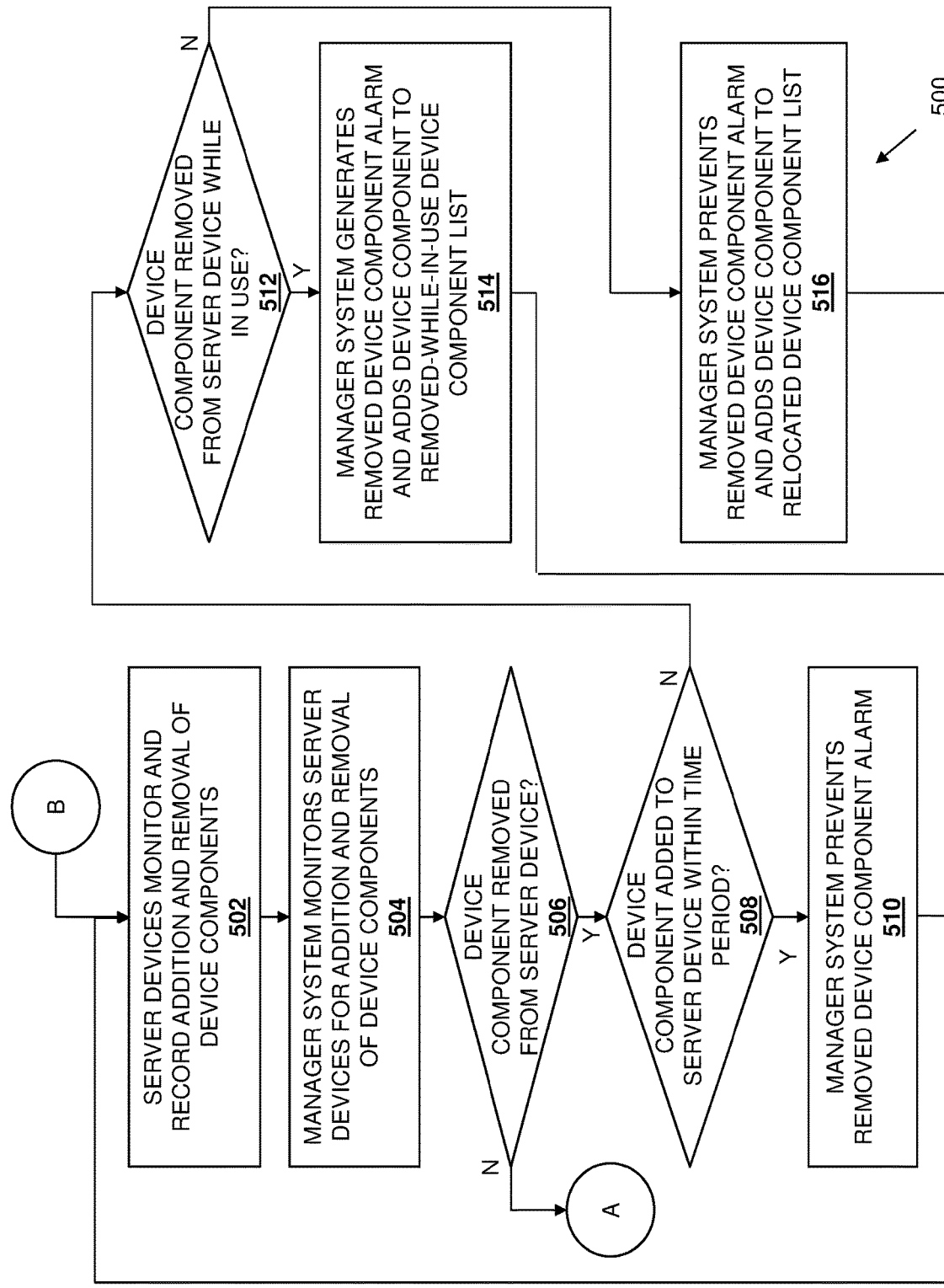
FIG. 5A is a flow chart illustrating an embodiment of a portion of a method for tracking device components.
Figure 5B:
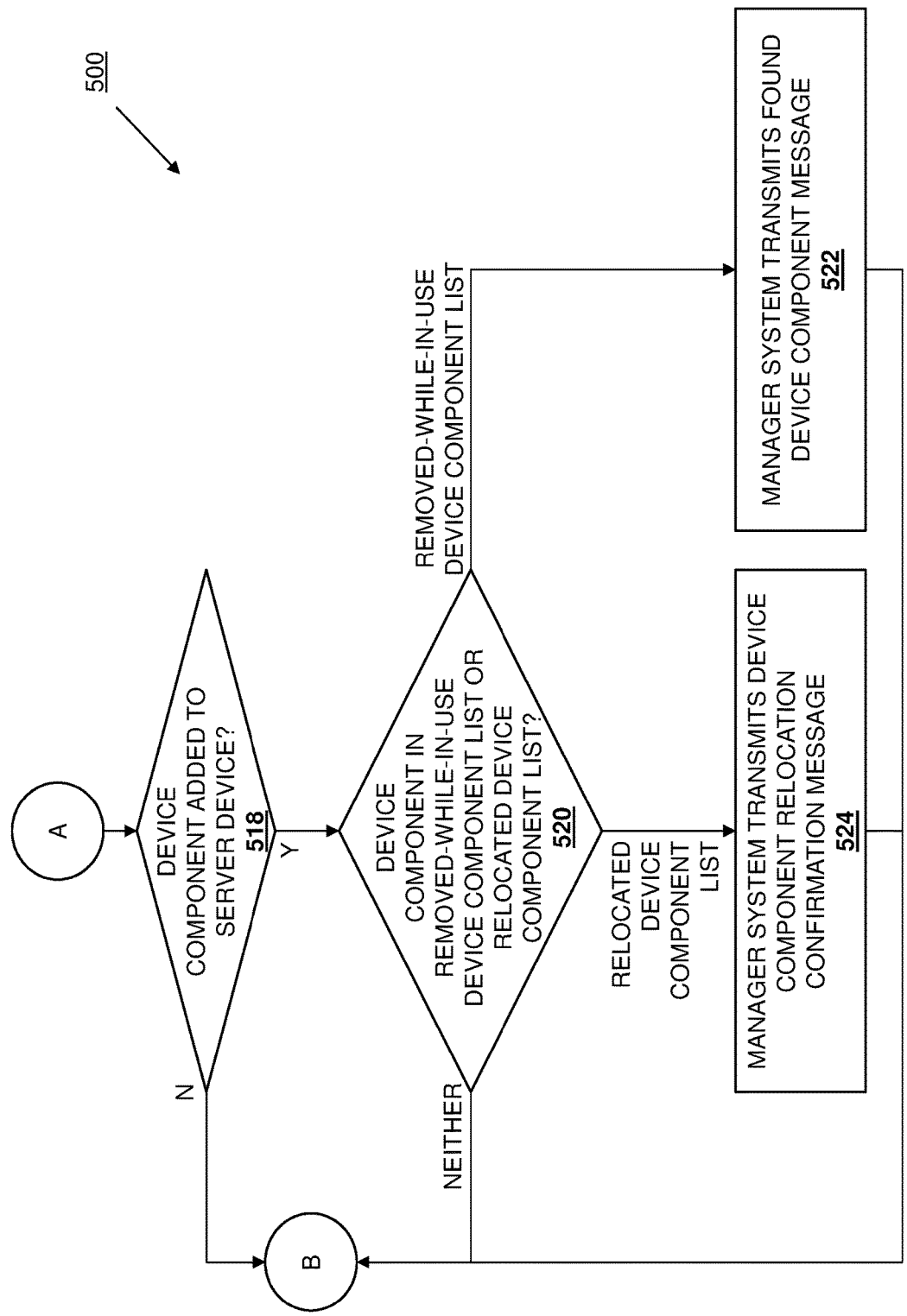
FIG. 5B is a flow chart illustrating an embodiment of a portion of a method for tracking device components.

Referring now to FIG. 5, an embodiment of a method 500 for tracking device components is illustrated. As discussed below, the systems and methods of the present disclosure provide for the tracking of device components utilized with devices. For example, device components utilized with server devices in a datacenter may be tracked via the teachings of the present disclosure by having each server device record the addition and removal of device components to that server device in its server device database. One or more of the server devices (or a separate, dedicated device) may act as manager device(s) and may operate to monitor the server device databases in each of the server devices in order to, for example, identify when device components that were previous added to those server devices are removed. Upon identifying that a device component was removed from a server device, the manager device will determine whether that device component is subsequently added to a server device (e.g., that same server device or a different server device) within a time period. In the event that the device component is added to a server device within the time period, the manager device prevents a removed device component alarm from being generated. However, in the event that the device component is not added to a server device within the time period, the manager device will then determine whether that device component was in use at the time of its removal from the server device.

In the event that the device component was removed from the server device while it was in use, the manager device generates a removed device component alarm, and adds that device component to a removed-while-in-use device component list. Furthermore, if that device component is then later identified as being added to a server device and it is determined that that device component is included in the removed-while-in-use device component list, the manager device will transmit a found device component message to a user associated with that device component in order to inform that user that the device component has been found. However, in the event that device component was removed from that server device while it was not in use, the manager device prevents a removed device component alarm from being generated, and adds that device component to a relocated device component list. Furthermore, if that device component is then later identified as being added to a server device and it is determined that that device component is included in the relocated device component list, the manager device will transmit a device component relocation confirmation message to a user associated with that device component in order to confirm the relocation of that device component with that user. As such, device component tracking is provided that tracks the location of device components in a datacenter while only generating alarms in situations associated with missing device components, while informing users when missing device components are found, and confirming when device components are relocated within the datacenter.

The method 500 begins at block 502 where server devices monitor and record addition and removal of device components. In an embodiment, at block 502, the device lifecycle controller engine 304a in any server device provided in the device component tracking system 200 may operate to monitor and record the addition and/or removal of device components in that server device. For example, with reference to FIG. 2, at block 502 the lifecycle controller engine 304a in any or all of the server devices 206a-c/300 (e.g., in a first datacenter) may operate to monitor and record the addition and/or removal of device components in that server device, the lifecycle controller engine 304a in any or all of the server devices 208a-c/300 (e.g., in a second datacenter) may operate to monitor and record the addition and/or removal of device components in that server device, and the lifecycle controller engine 304a in any or all of the server devices 210a-c/300 (e.g., in a third datacenter) may operate to monitor and record the addition and/or removal of device components in that server device. Furthermore, in some embodiments, the lifecycle controller engine 304a in the server group manager device 204a/400 (e.g., the manager device for the first datacenter) may operate to monitor and record the addition and/or removal of device components in that server device, the lifecycle controller engine 304a in the server group manager device 204b/400 (e.g., the manager device for the second datacenter) may operate to monitor and record the addition and/or removal of device components in that server device, and the lifecycle controller engine 304a in the server group manager device 204c/400 (e.g., the manager device for the third datacenter) may operate to monitor and record the addition and/or removal of device components in that server device. Further still, the lifecycle controller engine 304a in the master server group manager device 202/400 (e.g., the manager device for all of the first, second, and third datacenters) may operate to monitor and record the addition and/or removal of device components in that server device.

In some embodiments, the monitoring and recording of the additional of device components by server device(s) 300/400 at block 502 may include the lifecycle controller engine 304a in those server device(s) 300/400 detecting when device component(s) are connected to any of the component connectors 308a-c, retrieving a globally unique identifier (e.g., a part number) from those device component(s) via their connection to the component connector(s) 308a-c, and recording each globally unique identifier for a device component that has been detected as being connected to a component connector 308a-c along with some indication that that device component was added to the server device 300/400 in a lifecycle log (e.g., an eXtensible Markup Language (XML) document associated with that server device) that is included in the lifecycle database 306 in that server device 300/400. Similarly, the monitoring and recording of the removal of device components by server device(s) 300/400 at block 502 may include the lifecycle controller engine 304a in those server device(s) 300/400 detecting when device component(s) that are currently connected to any of the component connectors 308a-c are disconnected from those component connector(s) 308a-c, identifying a globally unique identifier (e.g., a part number) for those device component(s) upon detecting their disconnection from the component connector(s) 308a-c, and recording each globally unique identifier for a device component that has been detected as being disconnected from a component connector 308a-c along with some indication that that device component was removed from the server device 300/400 in the lifecycle log that is included in the lifecycle database 306 in that server device 300/400. However, while specific information (e.g., a globally unique identifier and addition/removal indication) has been discussed as being provided in a lifecycle log to record the addition and removal of device components in a server device, one of skill in the art in possession of the present disclosure will recognize that variety of unique device component information and/or other information (e.g., a time the device component was added to or removed from a server device, etc.) may be utilized to record the addition and/or removal of device components from a server device while remaining within the scope of the present disclosure as well.

Figure 6A:
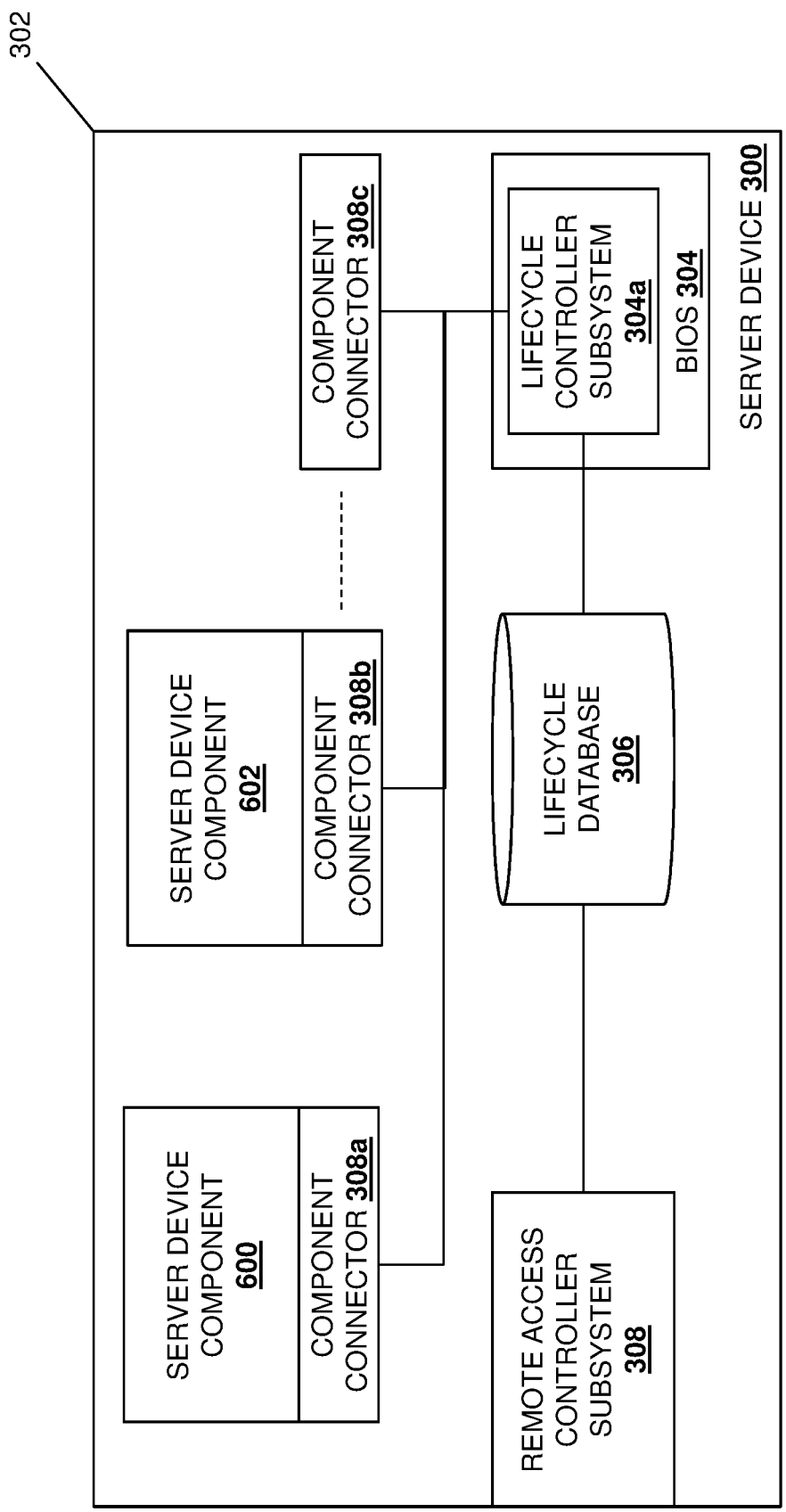
FIG. 6A is a schematic view illustrating an embodiment of the server device of FIG. 3 that may be one of the server devices in the device component tracking system of FIG. 2 and that includes a plurality of device components.

With reference to FIG. 6A, the server device 300 is illustrated with a server device component 600 connected to the component connector 308a, and a server device component 602 connected to the component connector 308b. In the examples, below, the server device 300 illustrated in FIG. 6A is the server device 206a, although one of skill in the art in possession of the present disclosure will recognize that device components may be provided in any of the server devices in the device component tracking system 200 while remaining within the scope of the present disclosure as well. In specific examples, the server device components 600 and 602 may be provided by Network Interface Controller (NIC) cards, memory devices, storage devices (e.g., Hard Disk Drives (HDDs), Solid State Drives (SSDs), etc.), circuit boards, and/or any of a variety of other device components that would be apparent to one of skill in the art in possession of the present disclosure.

As such, at block 502 (or prior to the method 500), the server device component 600 may have been connected to the component connector 308a in the server device 206a/300 and, in response, the lifecycle controller subsystem 304a may have detected that connection, retrieved the globally unique identifier for the server device component 600, and recorded that globally unique identifier along with some indication that the server device component 600 was added to the server device 206a/300 in a lifecycle log that is included in the lifecycle database 306 in that server device 206a/300. Similarly, at block 502 (or prior to the method 500), the server device component 602 may have been connected to the component connector 308b in the server device 206a/300 and, in response, the lifecycle controller subsystem 304a may have detected that connection, retrieved the globally unique identifier for the server device component 602, and recorded that globally unique identifier along with some indication that the server device component 602 was added to the server device 206a/300 in a lifecycle log that is included in the lifecycle database 306 in that server device 206a/300.

The method 500 then proceeds to block 504 where a manager system monitors server devices for the addition and removal of device components. In an embodiment, at block 504, any manager device(s) provided in the device component tracking system 200 may operate at block 504 to monitor the server devices in the device component tracking system 200 for the addition and/or removal of device components from those server devices. For example, the device component manager engine 402 in the server group manager device 204a may operate to monitor the server devices 206a-c (as well as itself in some embodiments) for the addition and removal of device components, the device component manager engine 402 in the server group manager device 204b may operate to monitor the server devices 208a-c (as well as itself in some embodiments) for the addition and removal of device components, and the device component manager engine 402 in the server group manager device 204c may operate to monitor the server devices 210a-c (as well as itself in some embodiments) for the addition and removal of device components. Furthermore, the device component manager engine 402 in the master server group manager device 202 may operate to monitor the server group manager devices 204a-c and their associated server devices 206a-c, 208a-c, and 210a-c (as well as itself in some embodiments) for the addition and removal of device components. However, while datacenter-specific server group manager devices that monitor server devices in respective datacenters, along with a master server group manager device that monitors server group manager devices and associated server devices, are illustrated and described, one of skill in the art in possession of the present disclosure will recognize that other monitoring configurations and monitoring hierarchies may be utilized in the device component tracking system of the present disclosure while remaining within its scope.

In an embodiment, the monitoring of server devices by manager device(s) at block 504 may include the device component manager engine 402 (in the server group manager devices 204a-c and/or the master server group manager device 202) accessing lifecycle logs included in lifecycle databases in each of those server devices. For example, at block 504 the device component manager engine 402 in the server group manager device 204a may utilize its remote access controller device 308 to access the lifecycle databases 306 in each of the server devices 206a-c via their respective remote access controller devices 308 (and in some embodiments may access its own lifecycle database 306 as well), the device component manager engine 402 in the server group manager device 204b may utilize its remote access controller device 308 to access the lifecycle databases 306 in each of the server devices 208a-c via their respective remote access controller devices 308 (and in some embodiments may access its own lifecycle database 306 as well), and the device component manager engine 402 in the server group manager device 204c may utilize its remote access controller device 308 to access the lifecycle databases 306 in each of the server devices 210a-c via their respective remote access controller devices 308 (and in some embodiments may access its own lifecycle database 306 as well). Furthermore, in some embodiments of block 504, the device component manager engine 402 in the master server group manager device 202 may utilize its remote access controller device 308 to access the lifecycle databases 306 in any or all of the server group manager devices 204a-c via their respective remote access controller devices 308, and/or the lifecycle databases 306 in any or all of the server devices 206a-c, 208a-c, and 210a-c via their respective remote access controller devices 308 (and in some embodiments may access its own lifecycle database 306 as well).

In a specific example, the device component manager engine 402 (in the server group manager devices 204a-c and/or the master server group manager device 202) in the device component tracking system 200 may include script, software code, and/or other instructions that configure the device component manager engine 402 to retrieve/receive lifecycle log(s) provided in the lifecycle database 306 of any server device/manager device in the device component tracking system 200 as input, and read those lifecycle log(s) in order to identify any information included therein. For example, the device component manager engine 402 may be configured to retrieve/receive and read lifecycle log(s) periodically, continuously, and/or at any frequency that would be apparent to one of skill in the art in possession of the present disclosure. As such, in some examples, each of the manager devices in the device component tracking system 200 may be configured to monitor for the addition and/or removal of device components in server devices in real-time while providing for the functionality discussed below.

Figure 6B:
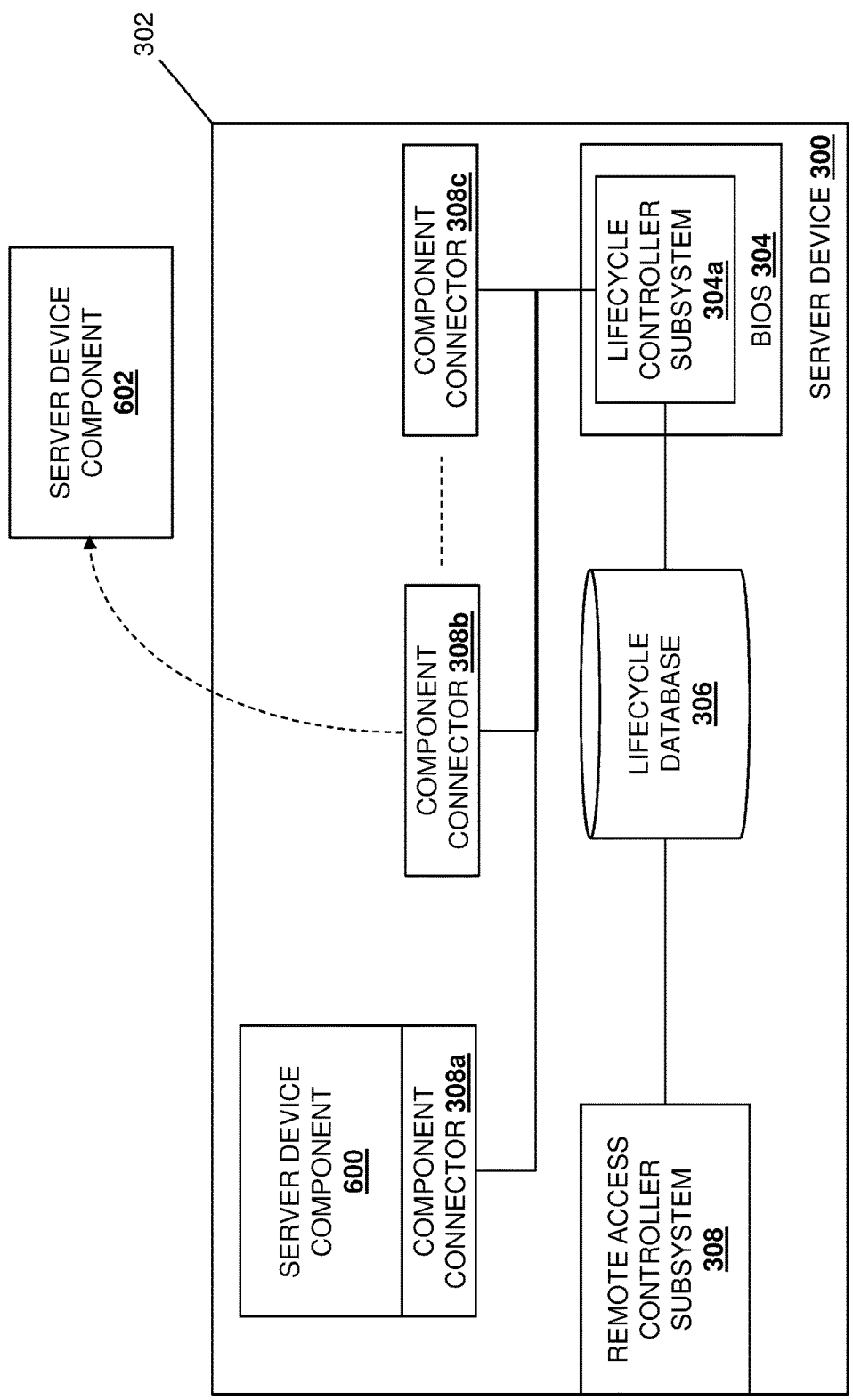
FIG. 6B is a schematic view illustrating an embodiment of the server device of FIG. 6A with a device component having been removed.

The method 500 then proceeds to decision block 506 where it is determined whether a device component has been removed from a server device. In an embodiment, at decision block 506, the device component manager engine 402 (in the server group manager devices 204a-c and/or the master server group manager device 202) may identify, via the monitoring performed at block 504, the removal of a device component from a server device. Continuing with the example provided above, and with reference to FIG. 6B, the server device component 602 that was connected to the component connector 308b in the server device 206a/300 (as illustrated in FIG. 6A) is illustrated as being disconnected from that component connector 308b. As such, as discussed above with regard to block 502 of the method 500, the lifecycle controller engine 304a in the server device 206a/300 may have detected the disconnection of the server device component 602 from the component connector 308b, identified a globally unique identifier for the server device component 602, and recorded that globally unique identifier for the server device component 602 along with some indication that that server device component 602 was removed from the server device 206a/300 in a lifecycle log that is included in the lifecycle database 306 in that server device 206a/300. In response, the monitoring discussed above with regard to block 504 of the method 500 will result in the device component manager engine 402 in the server group manager device 204a reading the globally unique identifier for the server device component 602 and the indication that that server device component 602 was removed from the server device 206a/300 in that lifecycle log (as well as any other information that is available including, for example, a time the server device component 602 was removed from the server device 206a/300), and identifying that that server device component 602 was removed from the server device 206a/300.

In some embodiments, the removal of a server device component from a server device may be identified by additional manager device as well. Continuing with the example provided above, in some embodiments, the device component manager engine 402 in the server group manager device 204a/400 that identified the removal of the server device component 602 from the server device 206a/300 at block 506 may operate to record the removal of that device component 602 from the server device 206a/300 in its device component manager database 404 (e.g., using the globally unique identifier for the server device component 602, the indication of removal, and/or other information discussed above). As such, in some embodiments, the device component manager engine 402 in the master server group manager device 202 may access the device component manager database 404 in the server group manager device 204a/400 and identify the removal of the device component 602 from the server device 206a/300 (e.g., similarly to the identification of the removal of the device component 602 from the server device 206a/300 by the device component manager engine 402 in the server group manager device 204a/400 described above.)

If, at decision block 506, it is determined that a device component has been removed from a server device, the method 500 proceeds to decision block 508 where it is determined whether that device component has been added to a server device within a time period. In an embodiment, at decision block 508, a device component manager engine 402 (in the server group manager devices 204a-c and/or the master server group manager device 202) that determines that a device component has been removed from a server device may operate to start a timer and/or otherwise track a time period that may begin when the device component was removed from that server device. Continuing with the example provided above, the device component manager engine 402 in the server group manager device 204a may operate to start a timer and/or otherwise track a time period that began when the server device component 602 was removed from the server device 206a/300. Furthermore, in some embodiments, a device component manager engine 402 in another manager device 400 (i.e., a manager device that did not directly determine that a server device component has been removed from a server device) may operate to start a timer and/or otherwise track a time period that may begin when the device component was removed from that server device. Continuing with the example provided above, the device component manager engine 402 in the master server group manager device 202 may operate to start a timer and/or otherwise track a time period that began when the server device component 602 was removed from the server device 206a/300.

In different embodiments, the time period discussed above may be a time period that is predefined by a user, may be dynamically determined by the device component manager engine 402, and/or may be determined in any of a variety of manners that would be apparent to one of skill in the art in possession of the present disclosure. For example, the time period discussed above may be the same for all device components. However, the time period discussed above may vary for different device components (e.g., relatively expensive device components may be provided shorter time periods compared to relatively inexpensive device components), may vary based on time of day (e.g., device components removed at the end of a work day may have relatively long time period compared to device components removed at the beginning of a work day), and/or may vary based on any of a variety of factors that would be apparent to one of skill in the art in possession of the present disclosure. As such, one of skill in the art in possession of the present disclosure will recognize that a variety of time periods determined in a variety of manners may be utilized at decision block 508 while remaining within the scope of the present disclosure.

Figure 6C:
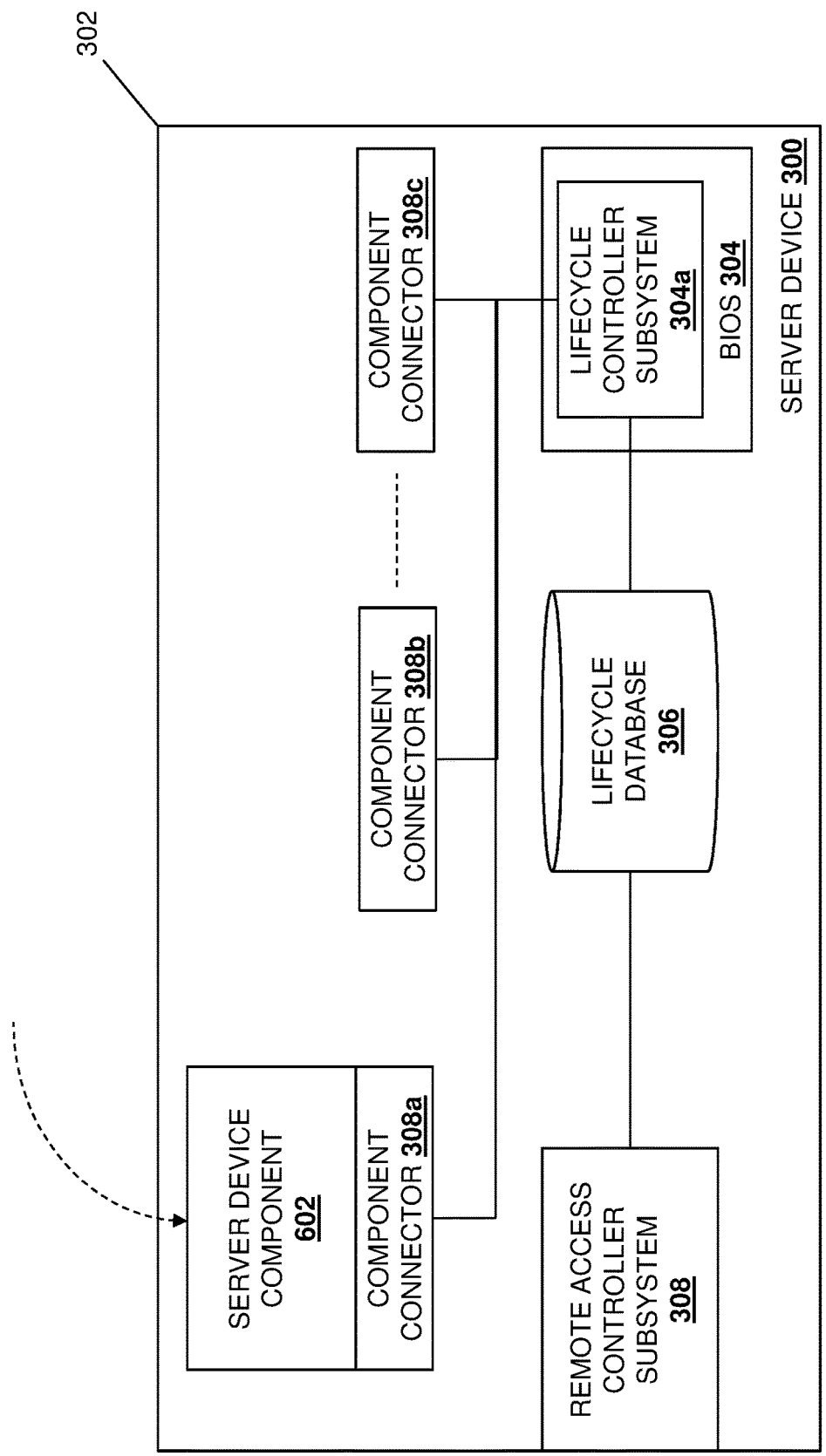
FIG. 6C is a schematic view illustrating an embodiment of the server device of FIG. 3 that may be one of the server devices in the device component tracking system of FIG. 2 and that has had a device component added to it.

As such, at decision block 508, the manager device(s) in the device component tracking system 200 may monitor the server devices in the device component tracking system 200 (e.g., in substantially the same manner discussed above with reference to block 502) to determine whether the server device component 602 is added to one of those server devices within the time period discussed above. With reference to FIG. 6C, the server device 300 is illustrated with the server device component 602 being connected to the component connector 308a. In the examples below, the server device 300 illustrated in FIG. 6C is the server device 206b and, as such, FIGS. 6A-6C may illustrate an example in which the server device component 602 is removed from the server device 206a/300 and added to the server device 206b/300 within the first datacenter described above. However, one of skill in the art in possession of the present disclosure will recognize that server device components may be provided in any of the server devices in the device component tracking system 200 while remaining within the scope of the present disclosure as well. For example, the server device component 602 removed from the server device 206a/300 may be added to any of the server devices 208a-c in the second datacenter or server devices 210a-c in the third datacenter described above.

As such, at decision block 508, the server device component 602 may have been connected to the component connector 308a in the server device 206b/300 and, in response, the lifecycle controller subsystem 304a in the server device 206b/300 may have detected that connection, retrieved the globally unique identifier for the server device component 602, and recorded that globally unique identifier along with some indication that the server device component 602 was added to the server device 206b/300 in a lifecycle log that is included in the lifecycle database 306 in that server device 206b/300. Furthermore, at decision block 508, the device component manager engine 402 in the server group manager device 204a may read that globally unique identifier for the server device component 602 and the indication that that server device component 602 was added to the server device 206b/300 in that lifecycle log (as well as any other information that is available including, for example, a time the server device component 602 was added to the server device 206b/300), and determine that that server device component 602 was added to the server device 206b/300. As discussed below, the addition of the server device component 602 to the server device 206b/300 may occur within the time period discussed above that follows the removal of that server device component 602 from the server device 206a/300, which may be recognized by the device component manager engine 402 in the server group manager device 204a. Furthermore, in some embodiments, the device component manager engine 402 in the master server group manager device 202 may determine the server device component 602 was added to a server device (e.g., one of the server devices 208a-c or 210a-c in a different datacenter than the server device 206a) within the time period in a similar manner as described above.

If, at decision block 508, it is determined that the device component has been added to a server device within the time period, the method 500 proceeds to block 510 where the manager system prevents a removed device component alarm. In an embodiment, at block 510 and in situations in which the device component that was removed from the server device at decision block 506 is added to a server device (which may be the same server device it was removed from, or a different server device as described in the examples above) within the time period, the device component manager engine 402 (in the server group manager devices 204a-c and/or the master server group manager device 202) may operate to prevent a removed device component alarm. Continuing with the example provided above, the addition of the server device component 602 to the server device 206b/300 may occur within the time period discussed above that follows the removal of that server device component 602 from the server device 206a/300 and, in response, the device component manager engine 402 in the server group manager device 204a/400 may operate to prevent a removed device component alarm. Furthermore, in some embodiments, the addition of the server device component 602 to a server device (e.g., one of the server devices 208a-c or 210a-c in a different datacenter than the server device 206a) may occur within the time period discussed above that follows the removal of that server device component 602 from the server device 206a/300 and, in response, the device component manager engine 402 in the master server group manager device 202/400 may operate to prevent a removed device component alarm.

In different examples, the prevention of the removed device component alarm by the device component manager engine 402 at block 516 may be performed in a variety of manners. For example, the generation of a removed device component alarm may be a default action that is performed by the device component manager engine 402 in response to the removal of a device component from a server device in the device component tracking system 200, and thus the device component manager engine 402 may operate to temporarily delay that default action subsequent to the removal of the device component from the server device until that time period expires, or cancel that default action in response to detecting the subsequent addition of that device component to a server device. However, in other examples, the prevention of the removed device component alarm by the device component manager engine 402 at block 516 may include any action or inaction that results in no removed device component alarm being generated. As such, the device component manager engine 402 may include instructions that do not provide for the generation of a removed device component alarm in response to detecting the addition of a device component to a server device within a time period subsequent to the removal of that device component from a server device, that those instructions may be considered to be preventing the generation of the removed device component alarm at block 516 as well. However, while a few examples have been provided, one of skill in the art in possession of the present disclosure will recognize that the prevention of the device component alarm at block 516 may be accomplished in a variety of manners that will fall within the scope of the present disclosure as well. Following the preventing of the removed device component alarm, the method 500 may return to block 502. As such, the method 500 may loop through blocks 502, 504, 506, 508, and 510 to detect device components removed from devices and prevent removed device component alarms as long as those device components are detected as added back in a server device within some time period.

If, at decision block 508, it is determined that the device component has not been added to a server device within a time period, the method 500 proceeds to decision block 512 where it is determined whether that device component was removed from the server device while it was in use. In an embodiment, at decision block 512, and in situations in which the device component manager engine 402 (in the server group manager devices 204a-c and/or the master server group manager device 202) does not detect that the device component that was removed from the server device at decision block 506 was added to a server device within the time period, that device component manager engine 402 may operate to determine whether that device component was in use when it was removed from the server device. Continuing with the example above, at decision block 512, the device component manager engine 402 in the server group manager device 204a may determine that the time period subsequent to the removal of the device component 602 from the server device 206a/300 has passed without detecting the addition of that device component 602 to any other server devices. Furthermore, in some embodiments, at decision block 512 the device component manager engine 402 in the master server group manager device 202 may determine that the time period subsequent to the removal of the device component 602 from the server device 206a/300 has passed without detecting the addition of that device component 602 to any other server devices. As such, server group manager devices and the master server group manager device may coordinate to identify when a time period has passed subsequent to the removal of a device component from a server device without its subsequent addition to a server device.

In response to determining that the time period has passed subsequent to the removal of a device component from a server device without its subsequent addition to a server device, the device component manager engine 402 (in the server group manager devices 204a-c and/or the master server group manager device 202) may determine whether that device component was in use when it was removed from the server device at block 506. Continuing with the example above, the device component manager engine 402 may operate to determine whether the device component 602 was in use when it was removed from the server device 206a/300 by, for example, determining that the device component was operating, communicating with other components in the server device, being utilized by other components in the server device, and/or otherwise serving the server device in manner that one of skill in the art in possession of the present disclosure would recognize as a use of that device component. In a specific example, a server device may include three storage devices, with only two of those storage device operating, having data read from or written to them within some recent time period, and/or otherwise serving the needs of the server device and, as such, those storage devices may be considered "in use" while the other storage device may not be considered "in use". Commands for determining whether a device component is in use may utilize a variety of device component status protocols (e.g., a Remote Access Controller ADMinistration (RACADM) protocol) that would be apparent to one of skill in the art in possession of the present disclosure. However, while a few examples have been provided, one of skill in the art in possession of the present disclosure will recognize that the use of a device component in a device may determined in a variety of manners that will fall within the scope of the present disclosure as well.

If, at decision block 512, it is determined that the device component was removed from the server device while it was in use, the method 500 proceeds to block 514 where the manager system generates a removed device component alarm and adds the device component to a removed-while-in-use device component list. As will be appreciated by one of skill in the art in possession of the present disclosure, the removal of a device component from a server device when that device component is being used by that server device may be associated with "bad" intentions such as, for example, the theft of the device component, the disablement or limiting of the functionality of the server device, etc. As such, in an embodiment, at block 514, the device component manager engine 402 (in the server group manager device 204a and/or the master server group manager device 202) may operate to generate a removed device component alarm. As discussed above, the generation of a removed device component alarm may be a default action that is temporarily delayed subsequent to the removal of the device component from the server device until a time period expires and, as such, at block 514 the device component manager engine 402 may perform that default action to generate that removed device component alarm.

However, in other examples, the generation of the removed device component alarm by the device component manager engine 402 at block 516 may include any action that results in a removed device component alarm being generated. As such, the device component manager engine 402 may include instructions that provide for the generation of a removed device component alarm in response to failing to detect the addition of a device component to a server device within a time period subsequent to the removal of that device component from a server device. Furthermore, at block 514, the device component manager engine 402 may add a device component identifier for the device component to a removed-while-in-use device component list that may operate to track device components that have been detected as being removed from any server device while in use and not added back into a server device. Continuing with the example provided above, at block 514 the device component manager engine 402 (in the server group manager devices 204a-c and/or the master server group manager device 202) may add a server device component identifier for the server device component 602 to a missing server device component list that may be stored in the device component manager database 404. Following the generation of the removed device component alarm and adding of the device component identifier to the removed-while-in-use device component list, the method 500 may return to block 502. As such, the method 500 may loop through blocks 502, 504, 506, 508, 512 and 514 to detect device components that are removed from devices while in use and not added back in a server device within some time period and, in response generate removed device component alarms and add associated device component identifiers to a missing device component identifier list.

If, at decision block 512, it is determined that the device component was not removed from the server device while it was in use, the method 500 proceeds to block 516 where the manager system prevents a removed device component alarm and adds the device component to a relocated device component list. As will be appreciated by one of skill in the art in possession of the present disclosure, the removal of a device component from a server device when that device component is not being used by that server device may be associated with "good" intentions such as, for example, the repurposing of the device component in a different server device, the retirement of the device component, etc. As such, in an embodiment, at block 516 and in situations in which the device component that was removed from the server device at decision block 506 was not in use when it was removed and was not added to a server device within the time period, the device component manager engine 402 (in the server group manager devices 204a-c and/or the master server group manager device 202) may operate to prevent a removed device component alarm, and may add the device component to a relocated device component list. Continuing with the example provided above, the removal of the server device component 602 from the server device 206a/300 may not be followed by the adding of that server device component 602 to another server device within the time period discussed above that follows the removal of that server device component 602 from the server device 206a/300, but at decision block 512 the device component manager engine 402 (in the server group manager device 204a/400 and/or the master server group manager device 202) may determine that the server device component 602 was not in use when it was removed from the server device 206a/300 and, in response may prevent a removed device component alarm. The prevention of the removed device component alarm may be performed in a manner that is substantially similar to that described above with reference to block 510.

Furthermore, at block 516, the device component manager engine 402 may add a device component identifier for the device component to a relocated device component list that may operate to track device components that have been detected as being removed from any server device while not in use and not added back into a server device. Continuing with the example provided above, at block 514 the device component manager engine 402 may add a server device component identifier for the server device component 602 to a relocated server device component list that may be stored in the device component manager database 404. Following the prevention of the removed device component alarm and adding of the server device component identifier to the relocated server device component list, the method 500 may return to block 502. As such, the method 500 may loop through blocks 502, 504, 506, 508, 512 and 516 to detect device components removed from devices while not in use and that are not added back into a server device and, in response, prevent removed device component alarms and add associated device component identifiers to a relocated device component identifier list.

If, at decision block 506, it is determined that a device component has not been removed from a server device, the method 500 proceeds to decision block 518 where it is determined whether a device component has been added to a server device. In an embodiment, at decision block 518, the device component manager engine 402 (in the server group manager device 204*a*/400 and/or the master server group manager device 202) may identify, via the monitoring performed at block 504, the addition of a device component to a server device. Continuing with the example provided above, and as discussed above with reference to FIG. 6C, the server device component 602 that was removed from the component connector 308*b* in the server device 206*a*/300 (as illustrated in FIG. 6A) is illustrated as being connected to a component connector 308*a* in the server device 206*b*. As such, as per block 502 of the method 500, the lifecycle controller engine 304*a* in the server device 206*b*/300 may detect connection of the server device component 602 to the component connector 308*a*, identify a globally unique identifier for the server device component 602, and record that globally unique identifier for the server device component 602 along with some indication that that server device component 602 was added to the server device 206*b*/300 in a lifecycle log that is included in the lifecycle database 306 in that server device 206*b*/300. In response, the monitoring at block 504 of the method 500 will result in the device component manager engine 402 (in the server group manager device 204*a* or the master server group manager device 202) reading the globally unique identifier for the server device component 602 and the indication that that server device component 602 was added to the server device 206*b*/300 in that lifecycle log (as well as any other information that is available including, for example, a time the server device component 602 was added to the server device 206*b*/300), and identifying that that server device component 602 was added to the server device 206*b*/300.

If, at decision block 518, it is determined that a device component has not been added a server device, the method 500 returns to block 502. If, at decision block 518, it is determined that a device component has been added a server device, the method 500 proceeds to decision block 520 where it is determined whether that device component is identified in a removed-while-in-use device component list or a relocated device component list. In an embodiment, at decision block 520, the device component manager engine 402 (in the server group manager device 204*a*/400 and/or the master server group manager device 202) may operate to access the removed-while-in-use device component list and/or the relocated device component list in the device component manager database 404, and determine whether the globally unique identifier associated with the device component that was detected as being added to a server device at decision block 518 is included on either of those lists. Continuing with the example provided above, the device component manager engine 402 (in the server group manager device 204*a* or the master server group manager device 202) may determine whether the globally unique identifier for the device component 602 in included in either of the removed-while-in-use device component list and/or the relocated device component list in the device component manager database 404.

If, at decision block 520, it is determined that the device component is identified in the removed-while-in-use device component list, the method 500 proceeds to block 522 where the manager device transmits a found device component message. In an embodiment, at decision block 520 the device component manager engine 402 (in the server group manager device 204*a* or the master server group manager device 202) may determine that the globally unique identifier for the device component 602 is included in the missing device list and, in response at block 522 may generate and transmit a found device component message. For example, the found device component message may include any information about the device component (e.g., the globally unique identifier, the time it was detected as being removed from the server device at block 506, a server device identifier for the server device from which it was removed at block 506, etc.), and may be sent to a user associated with that device component and/or the server device from which it was removed at block 506. However, while a few specific examples have been provided, one of skill in the art in possession of the present disclosure will recognize that the found device component message may include any of a variety of information while remaining within the scope of the present disclosure as well. In some embodiments, following the sending of the found device component message, the globally unique identifier for the server device component 602 may be removed from the removed-while-in-use device component list (e.g., in response to an appropriate response from a user receiving the found device component message, following the failure to receive an appropriate response for some time period from a user that received the found device component message, etc.)

If, at decision block 520, it is determined that the device component is identified in the relocated device component list, the method 500 proceeds to block 524 where the manager device transmits a device component relocation confirmation message. In an embodiment, at block 524 the device component manager engine 402 (in the server group manager device 204*a* or the master server group manager device 202) may determine that the globally unique identifier for the device component 602 is included in the relocated device component list and, in response at block 522 may generate and transmit a device component relocation confirmation message. For example, the device component relocation confirmation message may include any information about the device component (e.g., the globally unique identifier, the time it was detected as being removed from the server device at block 506, a server device identifier for the server device from which it was removed at block 506, etc.), and may be sent to a user associated with that device component and/or the server device from which it was removed at block 506. However, while a few specific examples have been provided, one of skill in the art in possession of the present disclosure will recognize that the device component relocation confirmation message may include any of a variety of information while remaining within the scope of the present disclosure as well. In some embodiments, following the sending of the device component relocation confirmation message, the globally unique identifier for the server device component 602 may be removed from the relocated device component list (e.g., in response to an appropriate response from a user receiving the found device component message, following the failure to receive an appropriate response from a user receiving the found device component message for some time period, etc.)

If, at decision block 520, it is determined that the device component is not identified in the removed-while-in-use device component list or the relocated device component list, or following blocks 522 or 524, the method returns to block 502. As such, the method 500 may loop through blocks 502, 504, 506, 518, 520, and in some examples 522 and 524, to detect device components added to devices, determine whether those device components are on removed-while-in-use device component lists and notify users of found device components if so, or determine whether those device components are on relocated device component lists and confirm with users about device relocations if so.

Thus, systems and methods have been described that provide for the tracking of device components by having devices record the addition and removal of device components, while having a manager device monitor the devices in order to identify when device components that were previous added to those devices are removed. Upon identifying such a removal, the manager device will determine whether that device component is subsequently added to a device within a time period and, if so, will prevent a removed device component alarm from being generated. However, in the event that the device component is not added to a device within the time period, the manager device will then determine whether that device component was in use at the time of its removal from the device and, if so, will determine that the device component was removed with "bad" intentions and, in response, generate a removed device component alarm and add that device component to a removed-while-in-use device component list. If that device component is then later identified as being added to a device and it is determined that that device component is included in the removed-while-in-use device component list, the manager device will inform that user that the device component has been found. However, in the event that device component was removed from that device while it was not in use, the manager device will determine that the device component was removed with "good" intentions and, in response, prevent a removed device component alarm from being generated, and add that device component to a relocated device component list. If that device component is then later identified as being added to a device and it is determined that that device component is included in the relocated device component list, the manager device will confirm the relocation of that device component with a user. As such, device component tracking is provided that tracks the location of device components in a datacenter while only generating alarms in situations associated with missing device components, while informing users when missing device components are found, and confirming when device components are relocated within the datacenter Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A component tracking system, comprising:
   a plurality of devices, wherein each of the plurality of devices includes:
      a device component monitoring subsystem that is configured to:
         monitor for and record the addition of device components to that device; and
         monitor for and record the removal of device components from that device;
   a device component manager system that is coupled to each of the plurality of devices, wherein the device component manager system is configured to:
      identify, via a recording by a first device monitoring subsystem in a first device that is included in the plurality of devices, the removal of a first device component from the first device;
      determine, via a recording by a second device component monitoring subsystem in a second device that is included in the plurality of devices, that the first device component has been added to the second device within a time period; and
      prevent, in response to determining that the first device component has been added to the second device within the time period, a removed first device component alarm.

2. The system of claim 1, wherein the device component manager system is configured to:
   identify, via a recording by a third device monitoring subsystem in a third device that is included in the plurality of devices, the removal of a third device component from the third device;
   determine, via respective device component monitoring subsystems in the plurality of devices, that the third device component has not been added to any of the plurality of devices within the time period;
   determine that the third device component was in use when it was removed from the third device; and
   generate, in response to determining that the third device component has not been added to any of the plurality of devices within the time period and that the third device component was in use when it was removed from the third device, a removed third device component alarm.

3. The system of claim 2, wherein the device component manager system is configured to:
   add, in response to determining that the third device component has not been added to any of the plurality of devices within the time period and that the third device component was in use when it was removed from the third device, a third device component identifier for the third device component to a removed-while-in-use device component list.

4. The system of claim 3, wherein the device component manager system is configured to:
   identify, via a recording by a fifth device monitoring subsystem in a fifth device that is included in the plurality of devices, the addition of the third device component to the fifth device;
   determine that the third device component identifier for the third device component is included in the removed-while-in-use device component list; and
   transmit, in response to identifying the addition of the third device component to the fifth device and determining that the third device component is included in the removed-while-in-use device component list, a found device component message.

5. The system of claim 1, wherein the device component manager system is configured to:
   identify, via a recording by a third device monitoring subsystem in a third device that is included in the plurality of devices, the removal of a third device component from the third device;
   determine, via respective device component monitoring subsystems in the plurality of devices, that the third device component has not been added to any of the plurality of devices within the time period;
determine that the third device component was not in use when it was removed from the third device; and
prevent, in response to determining that the third device component has not been added to any of the plurality of devices within the time period and that the third device component was not in use when it was removed from the third device, a removed third device component alarm.

6. The system of claim 5, wherein the device component manager system is configured to:
add, in response to determining that the third device component has not been added to any of the plurality of devices within the time period and that the third device component was not in use when it was removed from the third device, a third device component identifier for the third device component to a relocated device component list.

7. An Information Handling System (IHS), comprising:
a processing system; and
a memory system that is coupled to the processing system and that includes instructions that, when executed by the processing system, cause the processing system to provide a device component manager engine that is configured to:
identify, via a first device monitoring subsystem in a first device that is included in a plurality of devices, the removal of a first device component from the first device;
determine, via a second device component monitoring subsystem in a second device that is included in the plurality of devices, that the first device component has been added to the second device within a time period; and
prevent, in response to determining that the first device component has been added to the second device within the time period, a removed first device component alarm.

8. The IHS of claim 7, wherein the device component manager engine is configured to:
identify, via a third device monitoring subsystem in a third device that is included in the plurality of devices, the removal of a third device component from the third device;
determine, via respective device component monitoring subsystems in the plurality of devices, that the third device component has not been added to any of the plurality of devices within the time period;
determine that the third device component was in use when it was removed from the third device; and
generate, in response to determining that the third device component has not been added to any of the plurality of devices within the time period and that the third device component was in use when it was removed from the third device, a removed third device component alarm.

9. The IHS of claim 8, wherein the device component manager engine is configured to:
add, in response to determining that the third device component has not been added to any of the plurality of devices within the time period and that the third device component was in use when it was removed from the third device, a third device component identifier for the third device component to a removed-while-in-use device component list.

10. The IHS of claim 9, wherein the device component manager engine is configured to:

identify, via a fifth device monitoring subsystem in a fifth device that is included in the plurality of devices, the addition of the third device component to the fifth device;
determine that the third device component identifier for the third device component is included in the removed-while-in-use device component list; and
transmit, in response to identifying the addition of the third device component to the fifth device and determining that the third device component is included in the removed-while-in-use device component list, a found device component message.

11. The IHS of claim 7, wherein the device component manager engine is configured to:
identify, via a third device monitoring subsystem in a third device that is included in the plurality of devices, the removal of a third device component from the third device;
determine, via respective device component monitoring subsystems in the plurality of devices, that the third device component has not been added to any of the plurality of devices within the time period;
determine that the third device component was not in use when it was removed from the third device; and
prevent, in response to determining that the third device component has not been added to any of the plurality of devices within the time period and that the third device component was not in use when it was removed from the third device, a removed third device component alarm.

12. The IHS of claim 11, wherein the device component manager engine is configured to:
add, in response to determining that the third device component has not been added to any of the plurality of devices within the time period and that the third device component was not in use when it was removed from the third device, a third device component identifier for the third device component to a relocated device component list.

13. The IHS of claim 12, wherein the device component manager engine is configured to:
identify, via a fifth device monitoring subsystem in a fifth device that is included in the plurality of devices, the addition of the third device component to the fifth device;
determine that the third device component identifier for the third device component is included in the relocated device component list; and
transmit, in response to identifying the addition of the third device component to the fifth device and determining that the third device component is included in the relocated device component list, a device component relocation confirmation message.

14. A method for tracking device components, comprising:
identifying, by a device component manager system via a first device monitoring subsystem in a first device that is included in a plurality of devices, the removal of a first device component from the first device;
determining, by the device component manager system via a second device component monitoring subsystem in a second device that is included in the plurality of devices, that the first device component has been added to the second device within a time period; and
preventing, by the device component manager system in response to determining that the first device component has been added to the second device within the time period, a removed first device component alarm.

15. The method of claim 14, further comprising:

identifying, by the device component manager system via a third device monitoring subsystem in a third device that is included in the plurality of devices, the removal of a third device component from the third device;

determining, by the device component manager system via respective device component monitoring subsystems in the plurality of devices, that the third device component has not been added to any of the plurality of devices within the time period;

determining, by the device component manager system, that the third device component was in use when it was removed from the third device; and generating, by the device component manager system in response to determining that the third device component has not been added to any of the plurality of devices within the time period and that the third device component was in use when it was removed from the third device, a removed third device component alarm.

16. The method of claim 15, further comprising:

adding, by the device component manager system in response to determining that the third device component has not been added to any of the plurality of devices within the time period and that the third device component was in use when it was removed from the third device, a third device component identifier for the third device component to a removed-while-in-use device component list.

17. The method of claim 16, further comprising:

identifying, by the device component manager system via a fifth device monitoring subsystem in a fifth device that is included in the plurality of devices, the addition of the third device component to the fifth device;

determining, by the device component manager system, that the third device component identifier for the third device component is included in the removed-while-in-use device component list; and transmitting, by the device component manager system in response to identifying the addition of the third device component to the fifth device and determining that the third device component is included in the removed-while-in-use device component list, a found device component message.

18. The method of claim 14, further comprising:

identifying, by the device component manager system via a third device monitoring subsystem in a third device that is included in the plurality of devices, the removal of a third device component from the third device;

determining, by the device component manager system via respective device component monitoring subsystems in the plurality of devices, that the third device component has not been added to any of the plurality of devices within the time period;

determining, by the device component manager system, that the third device component was not in use when it was removed from the third device; and preventing, by the device component manager system in response to determining that the third device component has not been added to any of the plurality of devices within the time period and that the third device component was not in use when it was removed from the third device, a removed third device component alarm.

19. The method of claim 18, further comprising:

adding, by the device component manager system in response to determining that the third device component has not been added to any of the plurality of devices within the time period and that the third device component was not in use when it was removed from the third device, a third device component identifier for the third device component to a relocated device component list.

20. The method of claim 19, further comprising:

identifying, by the device component manager system via a fifth device monitoring subsystem in a fifth device that is included in the plurality of devices, the addition of the third device component to the fifth device;

determining, by the device component manager system, that the third device component identifier for the third device component is included in the relocated device component list; and transmitting, by the device component manager system in response to identifying the addition of the third device component to the fifth device and determining that the third device component is included in the relocated device component list, a device component relocation confirmation message.

\* \* \* \* \*